United States Patent [19]

Hopkins et al.

[11] Patent Number: 4,658,854

[45] Date of Patent: Apr. 21, 1987

[54] CONDUIT GUARDING AND CLAMPING DEVICE

[75] Inventors: Delaney C. Hopkins, Dwight; James W. Thais, White Heath, both of Ill.

[73] Assignee: Caterpillar Inc., Peoria, Ill.

[21] Appl. No.: 902,107

[22] Filed: Aug. 29, 1986

Related U.S. Application Data

[63] Continuation of Ser. No. 740,462, Jun. 3, 1985, abandoned.

[51] Int. Cl.⁴ ............................................. F16L 13/04
[52] U.S. Cl. ................................ 137/377; 137/355.17; 138/110; 248/75; 280/421
[58] Field of Search ........... 137/899, 377, 351, 355.17; 248/51, 54, 75; 138/110

[56] References Cited

U.S. PATENT DOCUMENTS

| 3,494,657 | 2/1970 | Tontlinger et al. | 280/421 |
| 3,872,881 | 3/1975 | Miller et al. | 280/421 |
| 3,901,270 | 8/1975 | Smith | 137/351 |
| 4,156,436 | 5/1979 | Hawle | 137/355.17 |
| 4,265,063 | 5/1981 | Muller | 137/377 |
| 4,267,674 | 5/1981 | Muller | 137/377 |
| 4,358,082 | 11/1982 | Reeves | 248/75 |
| 4,487,218 | 12/1984 | Sifri | 138/110 |

Primary Examiner—A. Michael Chambers
Attorney, Agent, or Firm—Calvin E. Glastetter

[57] ABSTRACT

A guarding and clamping device wherein a plurality of control lines are held in position by resilient blocks on a support member of a work machine. The control lines are also protected and maintained in an ordered arrangement by cover guard.

4 Claims, 3 Drawing Figures

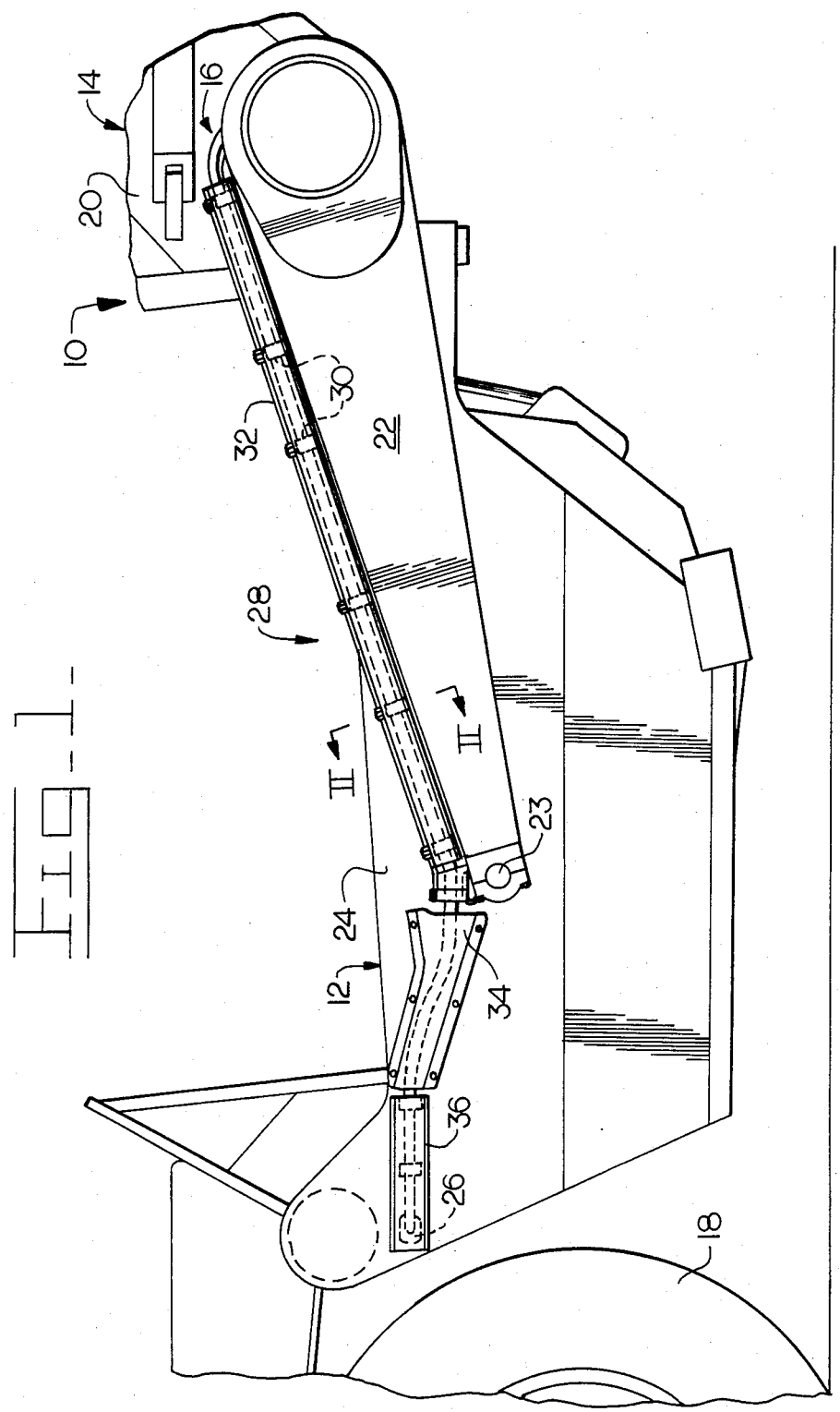

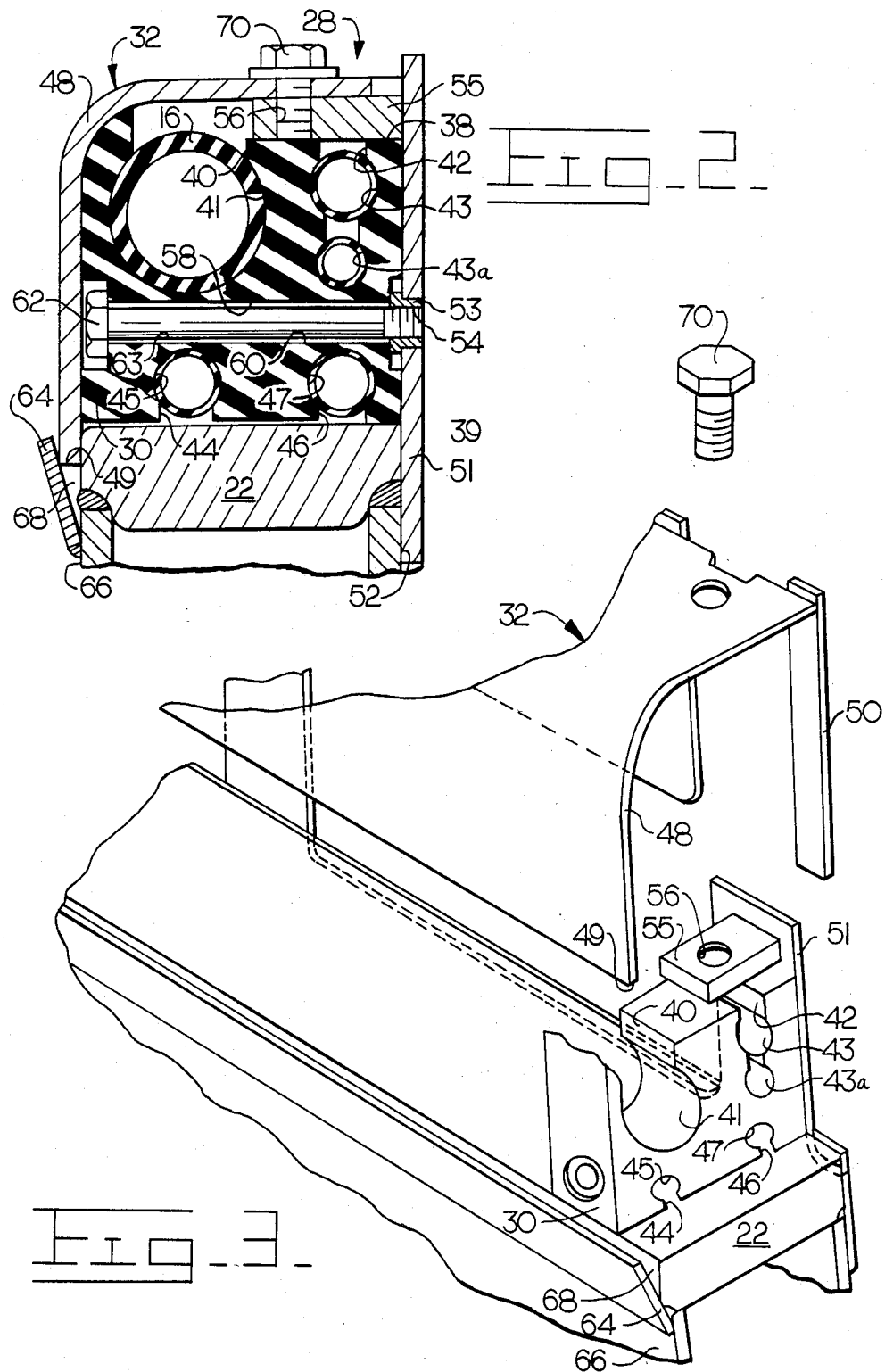

CONDUIT GUARDING AND CLAMPING DEVICE

This is a continuation of Ser. No. 740,462, filed June 3, 1985, now abandoned.

1. Technical Field

This invention relates generally to a conduit guarding and clamping device and more particularly to such a device which is adapted to locate a plurality of conduits in ordered arrangement on a support member of a work machine wnich are normally exposed and vulnerable to some environmental abuse.

2. Background Art

In a work machine, a plurality of hoses or conduits, which are used to operate hydraulic cylinders, motors and brakes and the like extend down a support member of the work vehicle. In prior art work machines, the lines were not guarded or clamped thus making them vulnerable to environmental abuse and damage. An object of the present invention is to provide a guard and clamp arrangement to protect the lines. The present invention is directed to overcoming the problem as set forth above.

DISCLOSURE OF THE INVENTION

In one aspect of the present invention, a clamping device for securing conduits to a frame is provided. The clamping device consists of containment means for holding the conduits in a parallel arrangement, cover guard means for protecting the containment means, and fastening means for securing the cover guard means to the frame and compressing the containment means to grip the conduits.

BRIEF DESCRIPTION OF THE DRAWINGS

FIG. 1 is a diagrammatic side elevation view of a scraper showing the clamping and guarding arrangement;

FIG. 2 is a diagrammatic sectional view of the clamp and guard taken along line II—II of FIG. 1;

FIG. 3 is a diagrammatic isometric exploded view of the clamp and guard;

BEST MODE FOR CARRYING OUT THE INVENTION

Referring now to FIG. 1, there is shown a wheeled scraper 10. The wheeled scraper 10 comprises a tractor unit (not shown), of which a scraper bowl portion 12 is illustrated, by means of a coupling hitch 14. A plurality of flexible control lines 16 interconnect control levers positioned on the tractor unit actuators carried by the scraper bowl 12 to control various functions such as brake actuation, ejector actuation.

The scraper bowl 12 is supported at its rearward end by a pair of wheels 18 at its forward end by a draft frame 20. The draft frame has a pair of rearwardly extending arms 22, each of which is pivotally connected by a pin 23 to an associated one of a pair of vertical sidewalls 24 of the scraper bowl 12 for swinging movement about a transverse substantially horizontal axis.

The plurality of control lines 16 are routed down the arm 22 and along the bowl sidewalls 24 to a junction block 26. From the junction block 26 lines go to various actuators to perform functions such as braking, load ejection and the like. As the lines 16 are routed down the arms 22, they are held in place by a clamping device 28. On the arms 22 the lines are held in place by a plurality of resilient blocks 30. A protective inverted U-shaped cover guard 32 is placed over the resilient block 30 and the lines 16. On the bowl sidewall 24 the resilient blocks 30 and lines 16 are protected by an intermediate cover guard 34 and a rear cover guard 36.

Referring now to FIG. 2, the resilient block 30 has an upper and lower surface 38 and 39. The upper surface 38 has a pair of slots 40 and 42. Slot 40 intersects a passage 41. Slot 42 intersects a pair of passages 43 and 43A. The lower surface 39 has a pair of slots 44 and 46 intersecting a respective passage 45 and 47. The cover guard 32 has an L-shaped plate 48 with a lower edge 49 and a straight plate 50. A plate 51 is welded to a first side 52 of the draft arm 22 to serve as an anchor. A fastener 53 having internal threads 54 is welded to the plate 51. A lug 55 having a threaded bore 56 is also welded to the plate 51. A spacer 58 is inserted in a bore 60 of block 30. A bolt 62 is inserted through a bore 63 of the spacer 58 and threaded into the fastener 53. A plate 64 is welded at an angle, to a second side 66 of the draft arm 22 to form a groove 68 between the draft arm 22 and plate 64. The lower edge 49 of the cover guard 32 is positioned within the groove 68. A bolt 70 fastens the cover guard 32 to the lug 55 on the plate 51.

Industrial Applicability

While the operation of the present invention is clearly apparent from the foregoing description, further amplification will be made in the following summary of the invention.

The lines 16 are inserted through the slots 40, 42, 44, and 46 into the passages 41, 43, 45 and 47 formed in the resilient blocks 30. The lines 16 are arranged in the same corresponding passages 41, 43, 45 and 47 in all the resilient blocks 30 so that the individual lines 16 are easily identifiable and properly arranged along the entire length of the draft arm 22 and bowl sidewall 24. After the hoses are positioned within the resilient block 30, the resilient blocks 30 are placed in position on top of draft arm 22. The spacer 58 is then inserted in bore 60 of the resilient block 30. The spacer 58 provides a positive stop when compressing the resilient block 30. After the spacer 58 is in position, bolt 62 is threaded into fastener 53. The bolt 62 is tightened, to compress the resilient block 30, until the movement of the bolt 62 is stopped by the spacer 58.

Proctective cover guard 32 is placed over the resilient block 30 and lines 16 to protect the lines 16 from damage. The lower edge 49 of plate 48 is inserted in the groove 68 formed between the plate 64 and the draft arm 22, thus protecting and also maintaining the lower edge 49 in position. The cover guard 32 is held in place by bolt 70 being threaded into bore 56 of lug 55. As the bolt 70 is tightened, the cover guard is moved downward and compresses the resilient block 30. The resilient block being compressed grips the lines 16 tighter and prevents movement of the hoses.

This arrangement protects the lines 16 from damage and also maintains the lines in position along the entire length of the scraper.

Other aspects, objects and advantages of this invention can be obtained from a study of the drawings, disclosure, and the appended claims.

We claim:

1. A guarding and clamping device for securing a plurality of tubular conduits to a frame, comprising:
   a plurality of elastomeric holding blocks each having a plurality of passages fromed therein for resiliently holding the conduits, said plurality of elastomeric holding blocks being spaced from each other along the frame;

cover guard means for shielding protecting the elastomeric holding blocks and the tubular conduits throughout the entire distance defined by the spaced elastomeric holding blocks; and fastening means for releasably securing the cover guard means to the frame so that the cover guard means compresses the elastomeric holding blocks into secure gripping relationship to the tubular conduits.

2. The guarding and clamping device of claim 1 wherein the cover guard means defines an elongate U-shaped trough extending in the general direction of the tubular conduits and having a edge formed thereon, said trough closely receiving the elastomeric holding blocks.

3. The guarding and clamping device of claim 2 including a plate attached to the frame and extending therefrom at an angle to form a groove therebetween, said groove being sufficient for receiving and protecting said edge of the cover guard means.

4. A guarding and clamping device for securing a plurality of tubular conduits to a frame comprising:

a plurality of elastomeric holding blocks each having a plurality of passages formed therein the resiliently holding the tubular conduits in a preselected spaced apart relationship, a first surface with a slot extending therefrom and intersecting one of said plurality of passages, and a second surface with a slot extending therefrom and intersecting with another one of said plurality of passages;

first fastening means releasably securing said elastomeric hold blocks to the frame, said first fastening means extending through said elastomeric holding blocks;

cover guard means for shieldingly protecting the elastomeric holding blocks and the tubular conduits throughout the entire distance defined by the spaced elastomeric holding blocks, the cover guard means forming a U-shaped trough closely receiving the elastomeric holding blocks and extending in the general direction of the tubular conduits; and second fastening means releasably securing the cover guard means to the frame and compressing the elastomeric holding blocks into secure gripping relationship with the tubular conduits.

* * * * *